United States Patent [19]
Botte

[11] Patent Number: 5,425,864
[45] Date of Patent: Jun. 20, 1995

[54] ELECTROLYSER FOR THE PRODUCTION OF A GAS

[75] Inventor: Luc Botte, Castiglioncello/Livorno, Italy

[73] Assignee: Solvay (Societe Anonyme), Brussels, Belgium

[21] Appl. No.: 183,962

[22] Filed: Jan. 21, 1994

[30] Foreign Application Priority Data

Jan. 22, 1993 [IT] Italy ............... MI93A0103

[51] Int. Cl.⁶ ............... C25B 9/00; C25B 15/08
[52] U.S. Cl. ............... 204/237; 204/256; 204/258; 204/266
[58] Field of Search ............... 204/237, 256, 257–258, 204/263–266, 252–255

[56] References Cited

U.S. PATENT DOCUMENTS

| | | | |
|---|---|---|---|
| 4,149,952 | 4/1979 | Sato | 204/258 |
| 4,322,281 | 3/1982 | Wright et al. | 204/237 |
| 4,375,400 | 3/1983 | Kircher | 204/237 |
| 4,379,044 | 4/1983 | Pere | 204/237 |
| 4,391,693 | 7/1983 | Pimlott | 204/237 |
| 4,505,789 | 3/1985 | Ford | 204/128 |
| 4,648,953 | 3/1987 | Wardle et al. | 204/237 |
| 4,832,804 | 5/1989 | Brattan | 204/237 X |
| 5,242,564 | 9/1993 | Traini | 204/258 |

FOREIGN PATENT DOCUMENTS

| | | |
|---|---|---|
| 0020887 | 1/1981 | European Pat. Off. . |
| 0053808 | 6/1982 | European Pat. Off. . |

*Primary Examiner*—Donald R. Valentine
*Attorney, Agent, or Firm*—Emmanuel J. Lobato

[57] ABSTRACT

Electrolyser for the production of a gas, comprising a battery (1) of electrolysis cells with membranes, in which the separation between the anode (8) and the cathode (28) is greater than the thickness of the membrane (4), an electrolyte degassing chamber (15), in communication with the upper part of the anodic (or cathodic) chambers (3), and an electrolyte recycling pipe (20, 21) joining the degassing chamber (15) to electrolyte distributors (10, 11, 12, 13) which are in communication with the anodic (cathodic) chambers (3) of the cells, the recycling pipe (20, 21) having a head loss coefficient which is equal, at most, to the overall coefficient of the head losses of the anodic (cathodic) chambers (3), of the distributors (10, 11, 12, 13) and of the degassing chamber (15).

13 Claims, 3 Drawing Sheets

ELECTROLYSER FOR THE PRODUCTION OF A GAS

The invention relates to electrolysers for the electrolytic production of a gas.

It more particularly relates to an electrolyser comprising a battery of electrolysis cells with membranes and with vertical electrodes, an electrolyte degassing chamber in communication with the cells and a pipe for recycling electrolyte from the degassing chamber to the cells.

An electrolyser of the type defined hereinabove is described in Patent Application EP-A-0,412,600 (SOLVAY). In this known electrolyser, the anodic chamber of each cell of the battery is in communication, at its lower part, with an electrolyte distributor, and, at its upper part, with the degassing chamber. The electrolyte distributors of all the anodic chambers of the cells of the battery are connected in parallel to the recycling pipe, which moreover opens out in the degassing chamber. During the operation of this known electrolyser, an aqueous solution of sodium chloride is electrolysed in the anodic chamber of each cell of the battery, such that chlorine is generated on the anode. The aqueous solution of sodium chloride, loaded with chlorine, rises in the anodic chamber and passes therefrom into the degassing chamber where separation of the chlorine and of the aqueous solution is performed, the latter returning into the anodic chambers of the battery of cells via the recycling pipe and the electrolyte distributors.

Optimum operation of this known electrolyser demands strict respecting of defined operating conditions. The pressure in the electrolysis chambers of the battery of cells constitutes a particularly important parameter, because inadequate pressure, even instantaneously, in an anodic chamber or in a cathodic chamber may give rise to irreversible mechanical damage of the membrane. The pressure in the electrolysis chambers is itself influenced by other parameters, especially by the inlet flow rate of the electrolyte into the battery of cells and by the geometrical characteristics of the electrolysis chambers and of the recycling pipe. It is difficult to control with precision the geometrical characteristics of the electrolysis chambers (such as the flatness of the electrodes and the thickness of the joints in the batteries of cells of the filter-press type) and this invariably results in disparities in the dimensions or the profile of the various cells of the battery. The flow rate of electrolyte recycled into the battery of cells constitutes another parameter which is difficult to control and is capable of affecting correct operation of the electrolyser.

It has now been found that, by a suitable choice of certain constructional characteristics of the electrolyser, it was possible substantially to reduce the occurrence, on operation of the electrolyser, of geometrical disparities of the cells of the battery, on the one hand, and of the variations in the electrolyte recycling flow rate, on the other hand.

The invention therefore relates to an electrolyser for the production of a gas, comprising:

a battery of electrolysis cells which each comprise an anodic chamber containing a substantially vertical anode, a cathodic chamber containing a substantially vertical cathode, arranged facing the anode, a selective-permeability membrane interposed between the anode and the cathode and isolating the anodic chamber from the cathodic chamber, and an electrolyte distributor in communication with the anodic (cathodic) chamber, at the lower part thereof, an electrolyte degassing chamber, in communication with the upper part of the anodic (cathodic) chamber of each cell, and an electrolyte recycling pipe joining the degassing chamber to the respective distributors of the anodic (cathodic) chambers of the battery of cells, the electrolyser being characterized in that the anode and the cathode have between them a separation greater than the thickness of the membrane, and in that the recycling pipe has a head loss coefficient which is at most equal to the overall coefficient of the head losses of the anodic (cathodic) chambers, of the distributors and of the degassing chamber.

In the definition of the electrolyser according to the invention, the expressions "substantially vertical anode" and "substantially vertical cathode" mean either anodes and cathodes which are strictly vertical or anodes and cathodes which occupy a position inclined with respect to the vertical, but with the inclination generally not exceeding an angle of 45 degrees (preferably 15 degrees) with respect to the vertical.

Furthermore, the terms lower part and upper part of an anodic (cathodic) chamber are intended to mean the regions thereof which are respectively situated below and above the middle of its height. In practice, the lower part is the lower third of the chamber and the upper part is its upper third.

The selective-permeability membrane is a thin, non-porous membrane, comprising an ion exchange material. The choice of the material constituting the membrane and of the ion exchange material will depend on the nature of the electrolytes subjected to the electrolysis and of the products which it is desired to obtain. As a general rule, the material of the membrane is chosen from those which are capable of withstanding the thermal and chemical conditions normally prevailing in the cells of the electrolyser during the electrolysis, the ion exchange material being chosen from the anion exchange materials or the cation exchange materials, depending on the electrolysis operations for which the electrolyser is intended. For example, in the case of an electrolyser intended for the electrolysis of aqueous solutions of sodium chloride for the production of chlorine, of hydrogen and of aqueous solutions of sodium hydroxide, membranes which are well-suited are cationic membranes made of fluorinated polymer, preferably perfluorinated polymer, containing cationic functional groups which are derivatives of sulphonic acid, of carboxylic acids or phosphonic acids or mixtures of such functional groups. Examples of membranes of this type are those described in Patents GB-A-1,497,748 (ASAHI KASEI KOGYO K.K.), U.S. Pat. No. 4,126,588 (ASAHI GLASS COMPANY LTD) and GB-A-1,402,920 (DIAMOND SHAMROCK CORP.). Membranes particularly suited to this application of the electrolyser according to the invention are those known under the names "NAFION" (DU PONT DE NEMOURS & Co) and "FLEMION" (ASAHI GLASS COMPANY LTD).

The battery of electrolysis cells necessarily comprises at least two electrolysis cells as defined hereinabove. In general, it comprises a number of electrolysis cells greater than two, preferably at least equal to 4. In principle, the invention imposes no upper limit on the number of cells of the battery. In practice, this number is, however, limited, by considerations of floor space, to values which rarely exceed 50, more generally 25. By way of example, mention may be made of batteries with 5 to 20 cells, batteries with 8 to 12 cells being generally well-suited. The battery of electrolysis cells may advantageously be formed by a stack of frames in the manner of a filter-press, as described in the aforementioned Patent EP-A-0,412,600.

The electrolyte distributor has the function, during the operation of the electrolyser, of ensuring the introduction of an electrolyte into the electrolysis chamber (anodic or cathodic) with which it is in communication, from an electrolyte source. In general, it comprises one or more tubes which join the electrolysis chamber to an electrolyte inlet pipe.

In the electrolyser according to the invention, this may equally well be all the anodic chambers or all the cathodic chambers which are joined to the degassing chamber and to the recycling pipe. These anodic (or cathodic) chambers are connected in parallel to the degassing chamber and to the recycling pipe.

During the operation of the electrolyser according to the invention, the electrolyte present in each anodic (cathodic) chamber is electrolysed, a gas is generated on the anode (the cathode) and, at the upper of the anodic (cathodic) chamber, an emulsion is collected which passes into the degassing chamber. The degassing chamber is a device which is well known in the state of the art, used for breaking up the emulsion in order to separate therefrom the gas and a dilute electrolyte.

The recycling pipe is used to return the aforementioned dilute electrolyte, or a part thereof, into the electrolysis chambers from which it comes, via the distributors of these electrolysis chambers. The unrecycled fraction of the dilute electrolyte of the degassing chamber is removed from the electrolyser. The recycling pipe may comprise an adjustable-opening valve, intended to regulate the size of the fraction of dilute electrolyte which is recycled into the electrolysis chambers. In the rest of the text the expression "recycling pipe" will be used to mean, in its entirety, the pipe proper and, if appropriate, the aforementioned valve which is incorporated therein.

According to the invention, the anode and the cathode of each electrolysis cell are held separated from each other, so as to produce between them a separation greater than the thickness of the membrane, it being understood that the thickness of the membrane is the dimension thereof which is transverse to the anode and to the cathode. In the electrolyser according to the invention, there is therefore a free space between the anode and the cathode, the width of this free space being the difference between the aforementioned separation and the thickness of the membrane. It is useful to avoid an excessive separation between the anode and the cathode, which would have the effect of excessively increasing the electrolysis voltage during the use of the electrolyser. The optimum separation between the anode and the cathode will then result from a compromise and depend on various factors, especially on the geometry of the anode and of the cathode, on their dimensions, on the thickness of the membrane and on the density of the electrolysis current. It should then be determined in each particular case by a series of routine tests. In practice, it is desirable for the width of the free space between the anode and the cathode to be at least 1 mm (preferably 2 mm), without exceeding 5 mm (preferably 4 mm). Widths of 2.5 to 3.5 mm have proved especially advantageous.

According to another characteristic of the electrolyser according to the invention, the recycling pipe has a head loss coefficient which is at most equal to the overall coefficient of the head losses of the anodic (cathodic) chambers, of the distributors and of the degassing chamber.

By definition, the coefficient of head loss K of a hydraulic circuit is the number defined by the relationship:

$$\Delta p = K \cdot \frac{v^2}{2g} \cdot \delta$$

where
  v denotes the average speed of a liquid in the hydraulic circuit,
  $\delta$ denotes the density of the liquid,
  $\Delta p$ denotes the pressure drop undergone by the liquid in the hydraulic circuit,
  g denotes the acceleration due to gravity,
  K denotes the head loss coefficient.

The term overall coefficient of the head losses of the anodic (cathodic) chambers, of the distributors and of the degassing chamber is intended to mean the head loss coefficient of the hydraulic circuit comprising the anodic (cathodic) chambers, the distributors, the degassing chamber and the junction elements joining the anodic chambers to the distributors and to the degassing chamber.

During normal operation of the electrolyser according to the invention, at least part of the electrolyte leaving the degassing chamber flows in closed circuit successively through the recycling pipe, the respective distributors of the anodic (cathodic) chambers, the said anodic (cathodic) chambers and the recycling chamber. The abovementioned characteristic of the electrolyser according to the invention has the result that the head loss undergone by the electrolyte in the recycling pipe does not exceed the head loss which it undergoes in the remaining part of the abovementioned closed circuit.

In the electrolyser according to the invention, it is preferable for the head loss coefficient of the recycling pipe to be less than the aforementioned overall coefficient of the head losses. In practice, it has proved advantageous for the ratio between, on the one hand, the head loss coefficient of the recycling pipe and, on the other hand, the sum of this coefficient and of the aforementioned overall coefficient to be less than 0.50, preferably than 0.35. It has proved desirable for this ratio to be greater than 0.020, preferably than 0.050. The values from 0.080 to 0.25 are especially advantageous.

In the electrolyser according to the invention, any suitable means may be used for producing the aforementioned ratio between the head loss coefficients. A particularly suitable means consists in generating a defined head loss in the distributor of the anodic (cathodic) chambers of the battery of electrolysis cells. For this purpose, in an advantageous embodiment of the electrolyser according to the invention, the distributor associated with each anodic (cathodic) chamber comprises a junction tube joining the recycling pipe to the said anodic (cathodic) chamber, the said tube having a calibrated constriction.

In a preferred variant of this embodiment of the invention, the calibrated constriction comprises a diaphragm of calibrated opening, inserted in the tube.

One advantageous feature of the electrolyser according to the invention resides in the great regularity of the flow rates and of the pressures of the fluids in the battery of the electrolysis cells. In particular, in the electrolyser according to the invention, the flow rates and the pressures of the fluids in the electrolysis cells are practically insensitive to the normal geometrical disparities of the cells and to the variations in the electrolysis conditions arising during normal operation of the electrolyser. The electrolyser according to the invention thus has the advantage of great regularity of the pressures and of the flow rates in the cells, which tends considerably to reduce the mechanical stresses on the membrane.

In a preferred embodiment of the electrolyser according to the invention, the sum of the individual head loss coefficients of the distributors is greater than half the aforementioned overall coefficient of the head losses. All other things being equal, this embodiment of the electrolyser according to the invention allows optimal regulated distribution of the flow rate of electrolyte between the individual electrolysis cells of the electrolyser. In this embodiment of the electrolyser according to the invention, the size of the individual head loss coefficients of the distributors compared to the aforementioned overall coefficient of the head losses will depend on the number of individual electrolysis cells of the electrolyser. In practice, it is desirable for the abovementioned sum of these individual coefficients not to exceed 10 times, preferably 5 times, half the aforementioned overall coefficient of the head losses, the values from 1.2 to 2 for the ratio between the said sum and the said overall coefficient being generally well suited.

In the electrolyser according to the invention, the individual head loss coefficients of the distributors are preferably substantially equal.

Features and details of the invention will emerge from the description of the attached drawings.

FIG. 1 diagrammatically represents, in vertical cross-section, one particular embodiment of the electrolyser according to the invention.

In these figures, the same reference notations denote identical elements.

Figure 1:
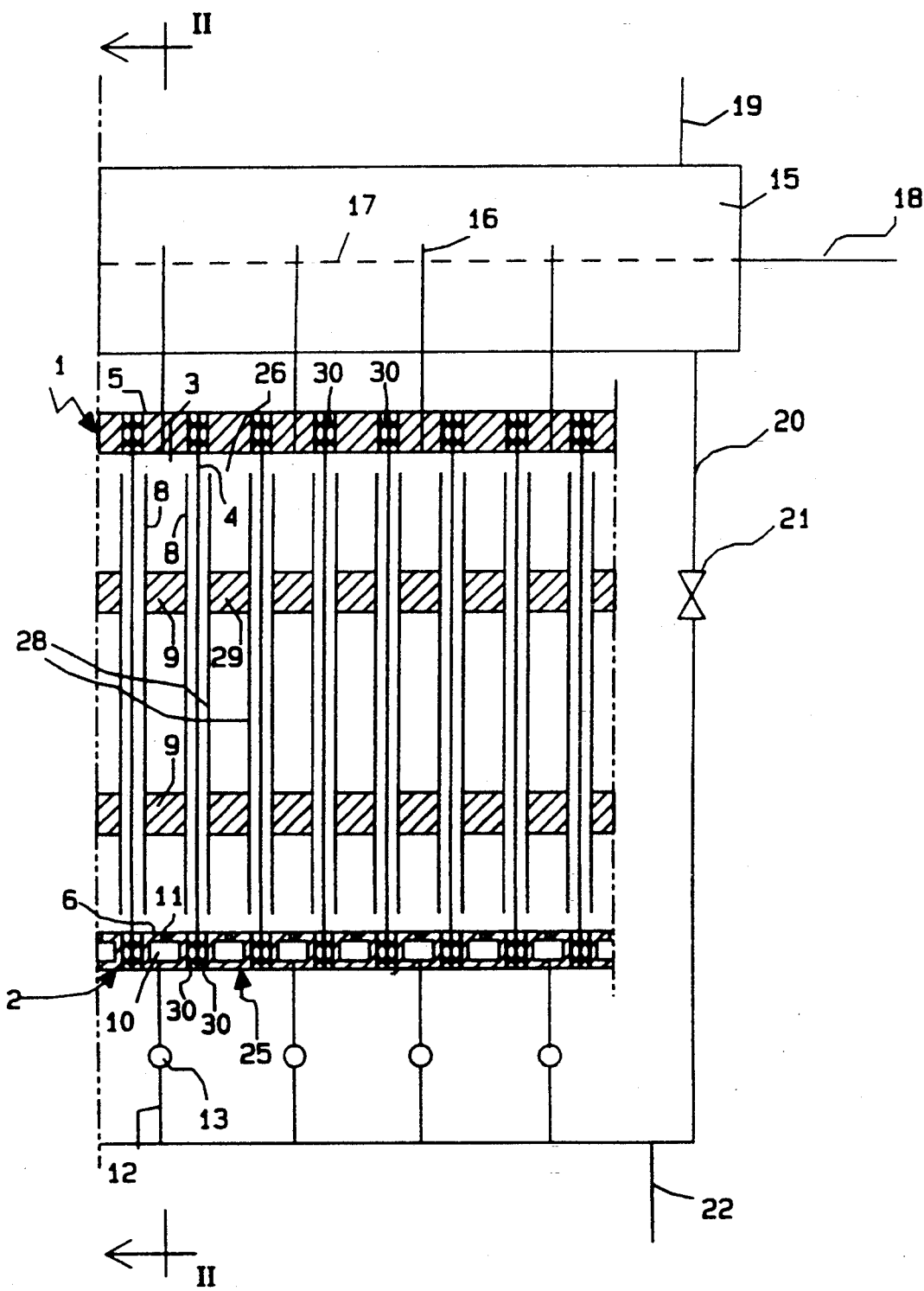

In FIG. 1, the reference notation 1 denotes a battery of electrolysis cells of the electrolyser. The battery of cells 1 is formed by a stack of vertical rectangular frames 2 and 25 which alternately delimit the anodic electrolysis chambers 3 and the cathodic electrolysis chambers 26. Membranes 4, selectively permeable to the cations, separate the anodic chambers 3 from the cathodic chambers 26. The leaktightness of the assembly is ensured by sealing joints 30, elastically compressed between the membranes 4 and the frames 2 and 25.

The frames 2 are each formed by an upper horizontal longitudinal member 5, by a lower horizontal longitudinal member 6 and by two vertical uprights 7 and 27.

Each anodic chamber 3 contains an anode formed by a pair of vertical metal plates 8 fixed on either side of horizontal metal bars 9 passing in a leaktight manner through the uprights 7 of the frames 2 to be connected in parallel to the positive terminal of a direct current source, not shown.

Similarly, each cathodic chamber 26 contains a cathode formed by a pair of vertical metal plates 28 fixed on either side of horizontal metal bars 29 passing through the uprights (not shown) of the frames 25, to be connected in parallel to the negative terminal of the current source.

FIG. 1 shows that, according to the invention, the separation between each anode 8 and the adjacent cathode 28 is greater than the thickness of the membrane 4 located between them. In practice, with the membrane having a substantially uniform thickness of approximately 200 to 300 $\mu$m, it is possible, for example, to make a separation of approximately 3 mm between the anode 8 and the adjacent cathode 28. This separation can easily be obtained by a suitable choice of the thickness of the sealing joints 30.

Each anodic chamber 3 is furthermore in communication with an electrolyte distributor. The latter comprises an inner chamber 10 of the lower longitudinal member 6, a row of openings 11 placing the inner chamber 10 in communication with the anodic chamber 3 and a tube 12 which passes through the longitudinal member 6 and opens in the inner chamber 10. The inner chamber 10 extends approximately over the entire length of the longitudinal member 6.

According to the invention, the tubes 12 have a calibrated constriction. This consists of a diaphragm 13 of calibrated opening 14 (FIG. 2), which is inserted between two segments of the tube 12.

Figure 2:
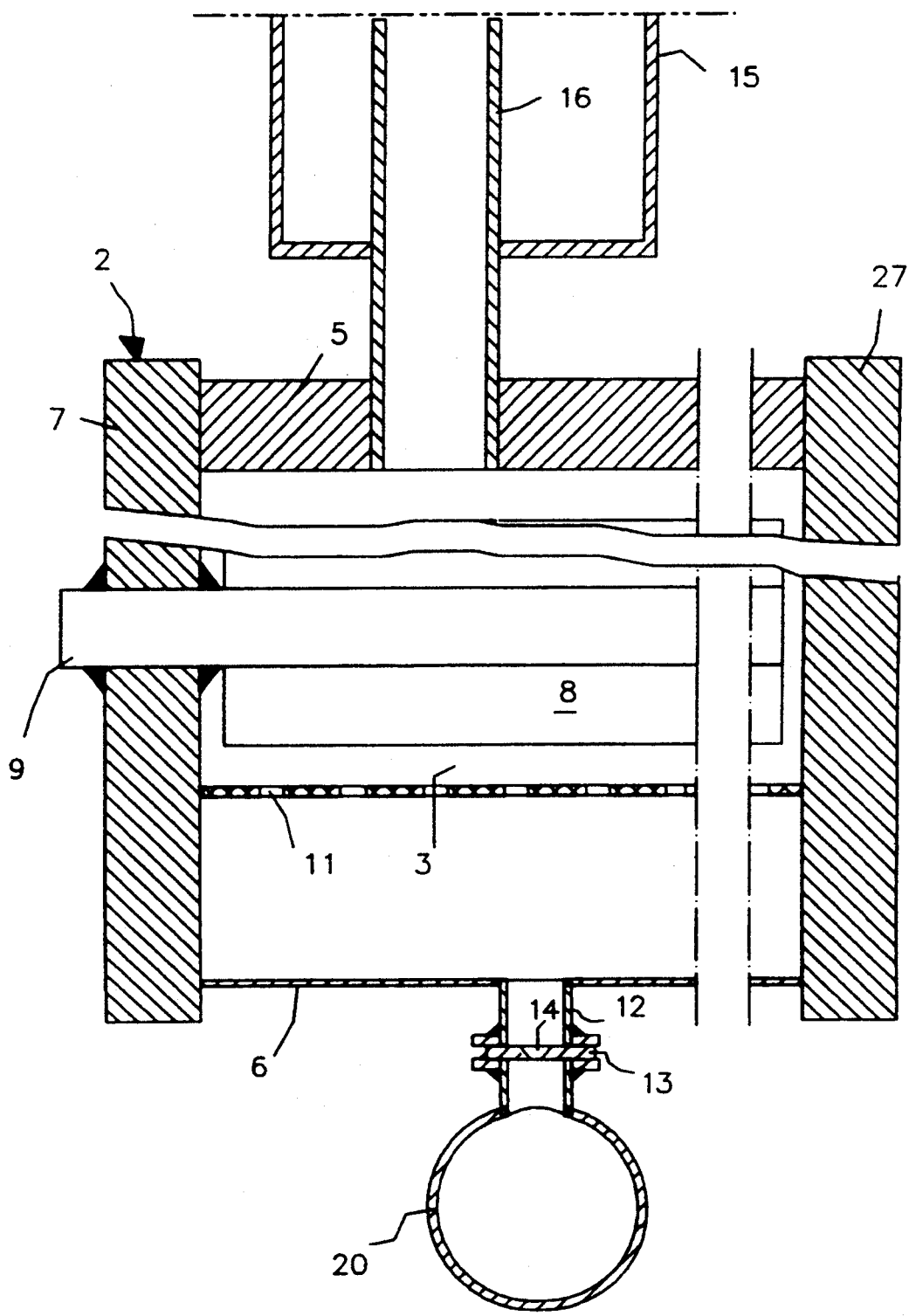
FIG. 2 is, on a large scale, a section along the plane II—II in FIG. 1.

The electrolyser represented in FIGS. 1 and 2 furthermore comprises a degassing chamber 15 which is situated above the battery of cells 1 and which is joined to the anodic chambers 3 by nozzles 16 passing through the upper longitudinal member 5 of the frames 2. The nozzles 16 open in the degassing chamber above the level 17 of an overfill pipe 18. The degassing chamber 15 is furthermore in communication, above the level 17, with a gas removal pipe 19.

A recycling pipe 20 joins the degassing chamber 15 to the tubes 12 of the anodic chambers 3. For this purpose, the respective tubes 12 of the anodic chambers are coupled in parallel with the recycling pipe 20 and the latter opens in the degassing chamber 15 under the level 17.

A general electrolyte inlet pipe 22 opens in the pipe 20. It is used for supplying the anodic chambers 3 with an electrolyte to be electrolysed.

The preceding description concerning the linking of the anodic chambers 3 to the degassing chamber 15 and to the recycling pipe 20 via the chambers 10 and the calibrated tubes 12 can be repeated for the cathodic chambers 26, another degassing chamber (connected in parallel onto the cathodic chambers) and another recycling pipe (joining this other degassing chamber to the cathodic chambers 26).

The electrolyser represented in FIGS. 1 and 2 is especially suited to the electrolytic production of chlorine and of aqueous solutions of sodium hydroxide. For this purpose, by way of the inlet pipe 22, an aqueous solution of sodium chloride is introduced into the anodic chambers 3, via the tubes 12 and the inner chambers 10 of the longitudinal members 6. Simultaneously, water or a dilute aqueous solution of sodium hydroxide is introduced into the cathodic chambers 26. With the anodes 8 and the cathodes 28 being joined to the direct current source, the aforementioned aqueous solutions are electrolysed in contact with the anodes 8 and the cathodes 28. In the anodic chambers 3, an emulsion of chlorine is formed in an aqueous solution of sodium chloride. This emulsion rises in the anodic chambers 3 and passes into the degassing chamber 15, via the nozzles 16. In the degassing chamber 15, the emulsion is broken up, the chlorine released is removed through the pipe 19 and the aqueous solution of sodium chloride separated from the chlorine returns into the anodic chambers 3 via the recycling pipe 20, the tubes 12 and the inner chambers 10 of the longitudinal members 6.

According to the invention, the opening 14 of the diaphragms 13 is chosen such that, during normal operation of the electrolyser, the head loss undergone by the aqueous solution of sodium chloride in the recycling pipe 20 is less than the head loss which it undergoes overall in all of the tubes 12, diaphragms 13, chambers 10, openings 11, anodic chambers 3, nozzles 16 and degassing chamber 15.

The two tests described in the following examples will illustrate the progress provided by the invention.

Example 1 (according to the invention)

An electrolyser similar to that described hereinabove was used, comprising a battery of 11 electrolysis cells. The cells used had a separation of approximately 3 mm between the anode and the cathode. For carrying out the test, a valve 21 was mounted in the recycling pipe 20 and a measurement was taken, for various positions of opening of the valve 21, of the ratio R between, on the one hand, the head loss coefficient in the recycling pipe 20 and in the valve 21 and, on the other hand, the sum of this coefficient and of the overall coefficient of the head losses in all of the tubes 12, diaphragms 13, chambers 10, openings 11, anodic chambers 3 and degassing chamber 15. In the example, the opening 24 of the diaphragms 13 was selected such that the aforementioned ratio R was substantially equal to 0.11 in the case where the valve 21 is in the maximum opening position, and to 0.35 in the case where the valve 21 occupies a position for which the passage cross-section for the electrolyte is substantially equal to 55% of the maximum passage cross-section (valve 21 in maximum opening position). The electrolysis of an aqueous solution of sodium chloride was carried out in the cell and the pressure in the upper part of the anodic chambers 3 was measured for various positions of the valve 21. The results of the test are represented by the curve 23 of the diagram in FIG. 3, in which the abscissa scale represents the position of opening of the valve 21 [the position O corresponding to the closure of the valve, the position 1 corresponding to a maximum opening (ratio R≈0.11) and the intermediate positions corresponding to partial openings (the position 0.55 corresponding to the ratio R=0.35)]and the ordinate scale represents the pressure (expressed in mm of water column) in the upper part of the electrolysis chambers, immediately under the upper longitudinal members 5.

Example 2 (reference)

The electrolyser of Example 1 was altered in the sense that the diaphragms 13 were eliminated. In the electrolyser thus altered, the aforementioned ratio R of the head loss coefficients varied from 0.32 (valve 21 in opening position 1) to 0.7 (valve 21 in opening position 0.55). The electrolysis conditions of Example 1 were repeated.

Figure 3:
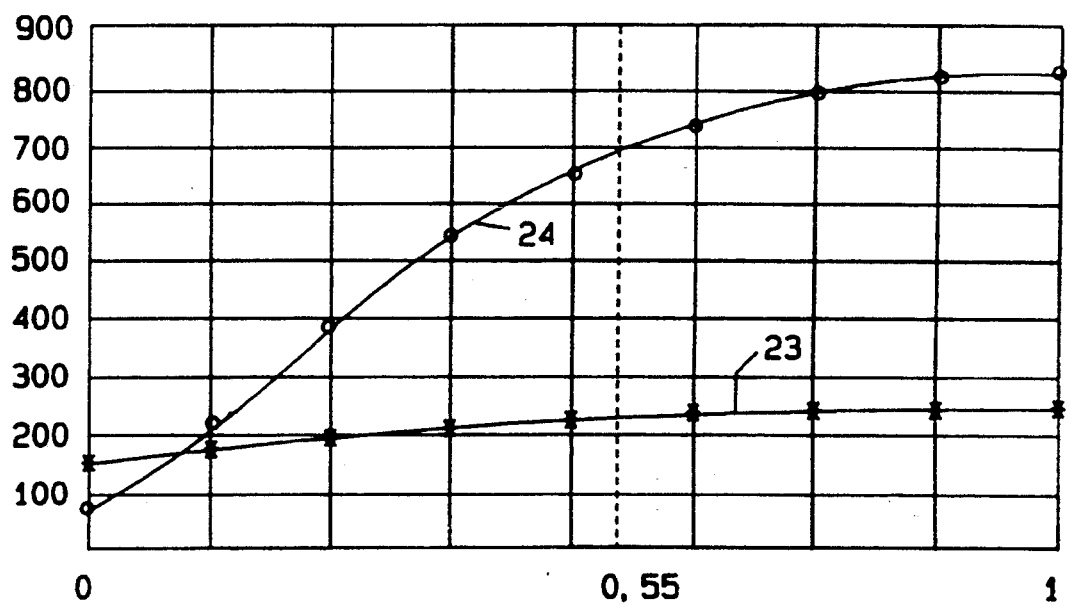
FIG. 3 is a diagram serving to illustrate two comparative examples.

The results of the test are represented by the curve 24 of the diagram in FIG. 3.

A comparison of the curves 23 and 24 of the diagram in FIG. 3 immediately shows that, in the case of Example 1 (curve 23), the pressure in the anodic chamber was influenced very little by the position of the valve 21, in contrast to the Reference Example 2 (curve 24). In other words, in the electrolyser of Example 1 (according to the invention), the pressure in the anodic chambers was markedly less sensitive to the variations in the operating conditions of the electrolyser, which constitutes an advantage and safety against the risk of accidents during industrial employment of the electrolyser. In the case of Example 2, the opening of the valve 21 had to be greatly limited (passage cross-section less than 20% of the maximum passage cross-section), in order to produce, in the anodic chambers 3, a pressure similar to that obtained in Example 1. Very small opening of the valve 21 has the result of greatly reducing the flow rate of the electrolyte in the recycling pipe 20, which is prejudicial to homogeneous distribution of the electrolyte in the anodic chambers 3 of the electrolyser. An essential difference between the electrolyser of Example 1 (according to the invention) and the electrolyser of Example 2 (reference), resides in the means used for regulating the flow rate of electrolyte into the electrolysis chambers 3. In the electrolyser (according to the invention) of Example 1, this means consists of the diaphragms 13 which individually regulate the flow rate of the electrolyte at the inlet of each cell 3 of the electrolyser, which promotes regulated distribution of the electrolyte between the cells 3. On the other hand, in the electrolyser of Example 2, the said means consists of the valve 21 which gives overall regulation of the flow rate of the electrolyte, upstream of the battery of cells 1, which does not allow regulation of the distribution of the electrolyte between the individual cells 3 of the battery 1.

I claim:

1. Electrolyser for the production of a gas, comprising:

a battery (1) of electrolysis cells which each comprise an anodic chamber (3) containing a substantially vertical anode (8), a cathodic chamber (26) containing a substantially vertical cathode (28), arranged facing the anode (8), a selective-permeability membrane (4) interposed between the anode (8) and the cathode (28) and isolating the anodic chamber (3) from the cathodic chamber (26), and an electrolyte distributor (10, 11, 12, 13) in communication with the anodic (cathodic) chamber, at the lower part thereof, an electrolyte degassing chamber (15), in communication with the upper part of the anodic (cathodic) chamber of each cell, an electrolyte recycling pipe (20, 21) joining the degassing chamber (15) to the respective distributors (10, 11, 12, 13) of the anodic (cathodic) chambers of the battery of cells, characterized in that the anode (8) and the cathode (28) have between them a separation greater than the thickness of the membrane (4), and in that the recycling pipe (20, 21) has a head loss coefficient which is at most equal to the overall coefficient of the head losses of the anodic (cathodic) chambers (3), of the distributors (10, 11, 12, 13) and of the degassing chamber (15).

2. Electrolyser according to claim 1, characterized in that the aforementioned separation between the anode (8) and the cathode (28) is at least 1 mm greater than the thickness of the membrane (4).

3. Electrolyser according to claim 2, characterized in that the aforementioned separation between the anode (8) and the cathode (28) is 2.5 to 3.5 mm greater than the thickness of the membrane (4).

4. Electrolyser according to claim 1 or 2 characterized in that the head loss coefficient of the recycling pipe (20, 21) is less than the aforementioned overall coefficient of the head losses.

5. Electrolyser according to claim 4, characterized in that the ratio between, on the one hand, the head loss coefficient of the recycling pipe (20, 21) and, on the other hand, the sum of this coefficient and of the aforementioned overall coefficient is less than 0.35.

6. Electrolyser according to claim 5, characterized in that the aforementioned ratio is 0.080 to 0.25.

7. Electrolyser according to claim 1 or 6 characterized in that the sum of the individual head loss coefficients of the distributors (10, 11, 12, 13) is greater than half the aforementioned overall coefficient of the head losses.

8. Electrolyser according to claim 7, characterized in that the sum of the individual head loss coefficients of the distributors (10, 11, 12, 13) is from 1.2 to 2 times half the aforementioned overall coefficient of the head losses.

9. Electrolyser according to claim 1 or 8 characterized in that the distributors (10, 11, 12, 13) have substantially equal individual head loss coefficients.

10. Electrolyser according to claim 1 or 9 characterized in that the distributor comprises a junction tube (12) joining the recycling pipe (20) to the anodic (cathodic) chamber (3), the said tube (12) having a calibrated constriction.

11. Electrolyser according to claim 10, characterized in that the calibrated constriction is a diaphragm (13) of calibrated opening (14), inserted in the tube (12).

12. Electrolyser according to claim 1 to 11 characterized in that the degassing chamber (15) is arranged above the battery (1) and comprises at least one nozzle (16) for junction with the anodic (cathodic) chamber (3) of each electrolysis cell.

13. Electrolyser according to any one of claim 1 or 12 characterized in that the selective-permeability membrane (4) is a membrane which is selectively permeable to the cations.

* * * * *